Sept. 1, 1931.  F. A. CALKINS  1,821,690
SPLASH GUARD FOR AUTOMOBILE REAR FENDERS
Filed Oct. 16, 1929
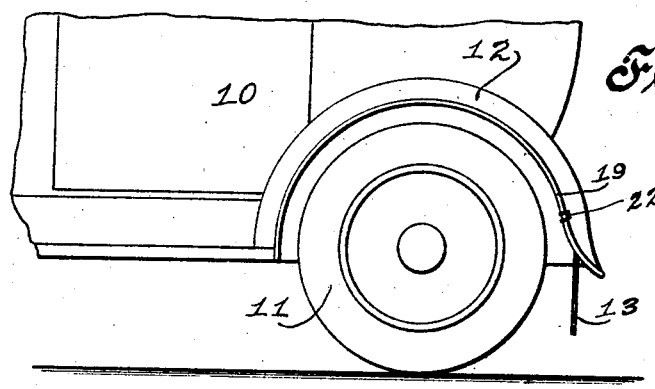
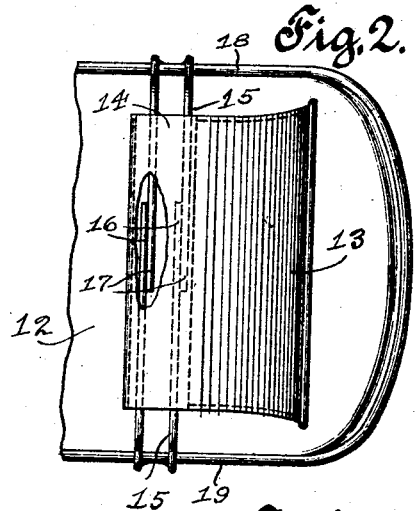
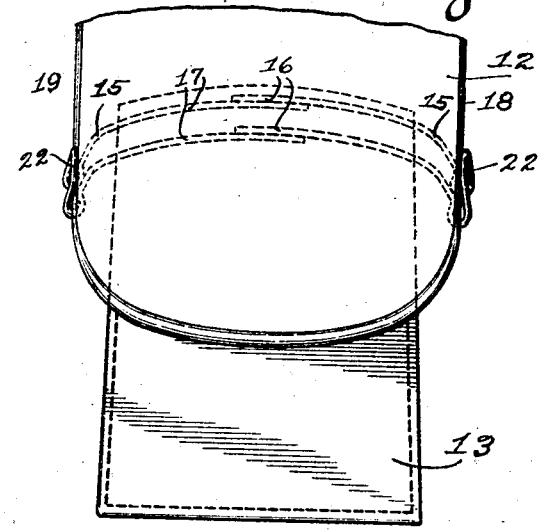
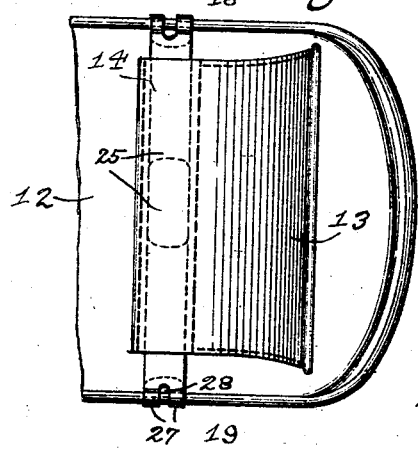
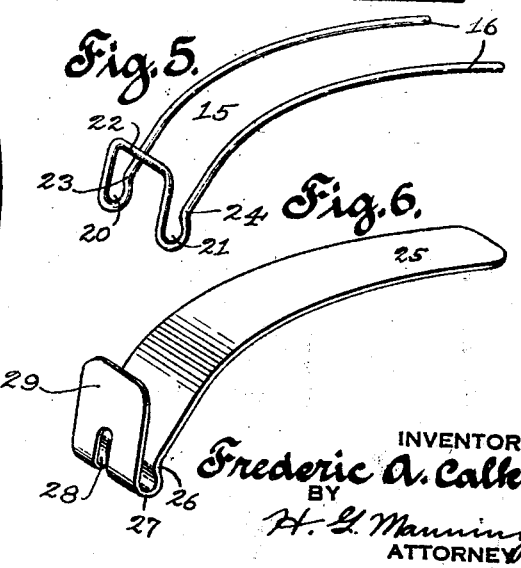
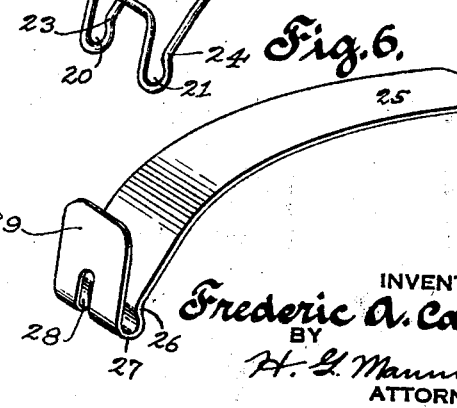
INVENTOR
Frederic A. Calkins
BY
H. G. Manning
ATTORNEY Patented Sept. 1, 1931

REISSUED 1,821,690

UNITED STATES PATENT OFFICE

FREDERIC A. CALKINS, OF WATERBURY, CONNECTICUT

SPLASH GUARD FOR AUTOMOBILE REAR FENDERS

Application filed October 16, 1929. Serial No. 399,972.

This invention relates to splash guards for the rear fenders of an automobile, and more particularly to an improved form of splash guard which may be readily attached to and detached from said fenders.

One object of the invention is to provide a detachable splash guard of the above nature which can be manually attached to and detached from a fender without drilling or cutting holes therein or using bolts, screws, or tools of any nature.

A further object is to provide a splash guard of the above nature having a fender-attaching device consisting of two relatively sliding members adapted to stretch slightly with the fender, and thereby preventing the splash guard from dropping off in case of sudden shocks or bumps.

A further object is to provide a device of the above nature which will be simple in construction, inexpensive to manufacture, practically invisible in use, easy to install, ornamental in appearance, and very efficient and durable in use.

With these and other objects in view, there have been illustrated on the accompanying drawings two forms in which the invention may be conveniently embodied in practice.

Fig. 1 represents a side view of the rear portion of an automobile and rear fender upon which the present invention has been installed.

Fig. 2 is a bottom view of the rear portion of said fender showing the improved splash guard in assembled position.

Fig. 3 is a rear view of the same.

Fig. 4 is a bottom view similar to Fig. 2, in which the splash guard is detachably held on the rear fender by a modified form of attaching device.

Fig. 5 is a perspective view of one of the pair of cooperating side members of the first form of attaching device.

Fig. 6 is a perspective view similar to Fig. 5, of one of the pair of side members comprising the second form of attaching device.

Referring now to the drawings in which like reference numerals denote corresponding parts throughout the several views, the numerals 10, 11, and 12 indicate an automobile body, the left rear wheel, and the left rear fender or mudguard, respectively. Depending from the lower end of the fender 12 is a splash guard 13, generally rectangular in shape, as most clearly shown in Fig. 3, and having a transverse slot or passage 14 at its forward end between the opposite layers of the fabric thereof for receiving the splash guard attaching device which may be of two forms, the first of which is shown in Figs. 2, 3 and 5, the second form being illustrated in Figs. 4 and 6.

The first form of splash guard attaching device comprises a pair of cooperating generally U-shaped wire members 15, each having a pair of parallel inwardly extending extremities 16 and 17. The extremities 16 and 17 are curved to fit snugly against the under side of the fender 12 between the side beads 18 and 19 thereof.

The extremities 16 and 17 are connected at their outer ends by a pair of loops 20 and 21, said loops being joined together by reversely bent U-shaped bridge members 22, shoulders 23 and 24 being formed at the junctions between the loops 20 and 21 and the extremities 16 and 17, respectively. The space between the vertical legs of the bridge member 22 and the shoulders 23 and 24 is made such that when the attaching members are pushed up over the beads 18 and 19 of the rear fender 12, the bridges 22 will snap inwardly and clamp the fender tightly.

When in assembled position, the extremities 16 and 17 of the cooperating pair of attaching members 15 will lie alongside one another, as shown in Figs. 2 and 3, to provide an adjustable sliding fit upon various sizes of fenders. By means of this construction, the attaching members will be permitted to yield with any strains which cause a slight lateral movement of the beads 18 and 19 of the fender thereby preventing the splash guard from being injured or falling off, which was one of the disadvantages of prior splash guards.

One advantage of the present invention is that even if one of the attaching members is accidentally moved out of position along the edge of the fender, the splash guard will remain securely in position because of the strong gripping action at the ends of the attaching members.

In the modified form of the invention shown in Figs. 4 and 6, the splash guard 13 is identical with that of the first form of the invention. The attaching clip members, however, instead of being bent up from wire, are made from strip metal and each comprises a curved inner extremity 25, shoulders 26, bottom loops 27, between which is a cut-out slot 28, and an upwardly extending bridge member 29.

When the modified form of attaching members are installed in the splash guard, it will be noticed, as viewed in Fig. 4, that the extremities 25 overlie one another in slidable relationship. The operation of the device is otherwise identical with that of the first form.

While there have been disclosed in this specification two forms in which the invention may be embodied, it is to be understood that these forms are shown for the purpose of illustration only, and that the invention is not to be limited to the specific disclosures but may be modified and embodied in various other forms without departing from its spirit. In short, the invention includes all the modifications and embodiments coming within the scope of the following claims.

Having thus fully described the invention, what is claimed as new, and for which it is desired to secure Letters Patent, is:

1. In a device for attaching a splash guard to the rear fender of an automobile, a pair of clamping members each having a pair of parallel portions adapted to be slidably inserted within a transverse slot in the splash guard, each of said portions having at their outer ends a resilient clip for detachably engaging one of the depending beads at the sides of the fender.

2. In a device for attaching a splash guard to the rear fender of an automobile, a pair of clamping members each having a pair of curved parallel portions adapted to be slidably inserted within a transverse slot in the splash guard, each of said portions having at their outer ends a resilient clip for detachably engaging one of the depending beads at the sides of the fender.

3. In a device for attaching a splash guard to the rear fender of an automobile, a pair of clamping members each having a pair of parallel portions curved to fit the underside of the fender and adapted to be slidably inserted within a transverse slot in the splash guard, each of said portions having at their outer ends a resilient clip for detachably engaging one of the depending beads at the sides of the fender.

4. In a device for attaching a splash guard to the rear fender of an automobile, a pair of wire clamping members each having a pair of parallel portions adapted to be slidably inserted within a transverse slot in the splash guard, each of said portions having at their outer ends a resilient clip for detachably engaging one of the depending beads at the sides of the fender.

5. In a device for attaching a splash guard to the rear fender of an automobile, a pair of clamping members for detachably gripping the depending beads at opposite sides of the fender, each of said members having inwardly extending extremities, the outer ends of said clamping members comprising depending loops and an upstanding bridge member connecting said loops, the space between said loops and said bridge being such that when the clamping members are pushed up over the fender beads, the bridges will snap inwardly and hold the splash guard tightly on the fender.

6. In a splash guard for an automobile fender having a beaded rim, a guard member, and a pair of adjustable members on said guard member having resilient clips extending therefrom to detachably snap over the beaded rim of said fender to hold said guard member in position.

7. In a splash guard for an automobile fender having a beaded rim, a guard member, and a pair of adjustable overlapping members on said guard member having spring clips to detachably snap over the beaded rim of said fender to hold said guard member in position.

8. In a splash guard for an automobile fender having a beaded rim, a guard member, and a pair of resilient wire members on said guard member having end clips to detachably snap over the beaded rim of said fender to hold said guard member in position.

9. In a splash guard for an automobile fender having a beaded rim, a guard member, and a pair of resilient looped wire clip members on said guard member for detachably clamping about the beaded rim of said fender to hold said guard member in position.

In testimony whereof, I have affixed my signature to this specification.

FREDERIC A. CALKINS.